May 21, 1963 J. A. PORTER ETAL 3,090,900
AUTOMATICALLY REVERSIBLE MOTOR FOR DOMESTIC APPLIANCE
Filed Jan. 14, 1960 2 Sheets-Sheet 1

INVENTORs.
James A. Porter
Leonard A. Staskelunas
BY
Edwin S. Dybvig
Their Attorney May 21, 1963   J. A. PORTER ETAL   3,090,900
AUTOMATICALLY REVERSIBLE MOTOR FOR DOMESTIC APPLIANCE
Filed Jan. 14, 1960   2 Sheets-Sheet 2

INVENTORS.
James A. Porter
Leonard A. Staskelunas
BY
Edwin S. Dybvig
Their Attorney United States Patent Office 3,090,900
Patented May 21, 1963

3,090,900
AUTOMATICALLY REVERSIBLE MOTOR FOR DOMESTIC APPLIANCE
James A. Porter and Leonard A. Staskelunas, Warren, Ohio, assignors to General Motors Corporation, Detroit, Mich., a corporation of Delaware
Filed Jan. 14, 1960, Ser. No. 2,486
1 Claim. (Cl. 318—207)

This invention relates to a domestic appliance and more particularly to a garbage or waste disposal unit control.

It is an object of this invention to provide a control circuit for a disposal unit wherein the disposal motor reverses its direction of rotation in the event that the disposal rotor jams.

Waste disposal units frequently give trouble when overloaded or when some large solid object, such as a bone, becomes wedged between the impeller and a portion of the stationary cutting surfaces located adjacent the rotation impeller. It has been found that this trouble can be remedied by providing means for automatically reversing the direction of rotation of the rotor in response to a motor overload.

It is an object of this invention to provide a simple yet reliable arrangement for automatically reversing the direction of rotation of the drive motor whenever the disposer becomes jammed.

Further objects and advantages of the present invention will be apparent from the following description, reference being had to the accompanying drawings wherein preferred embodiments of the present invention are clearly shown.

Figure 1:
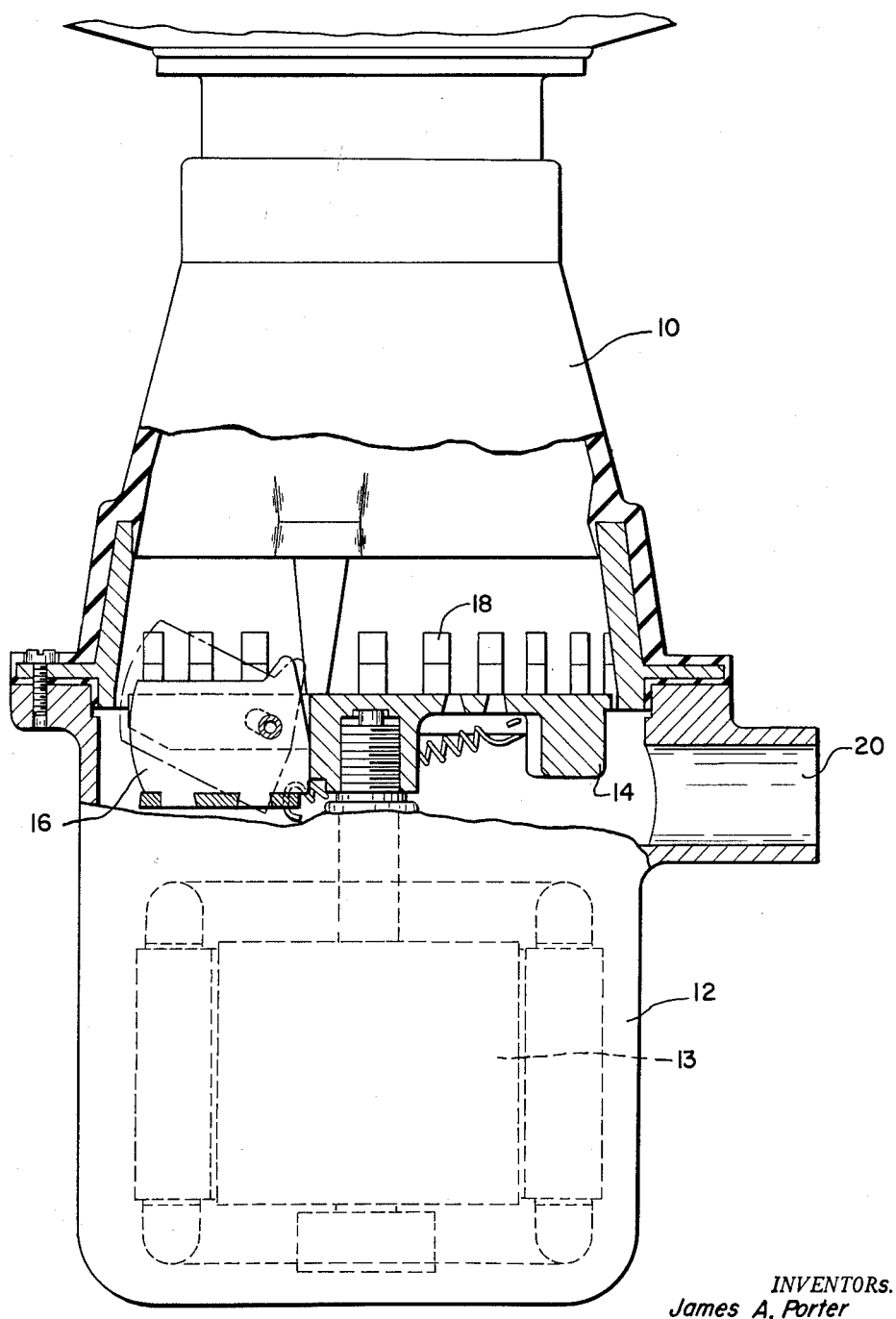
Figure 3:
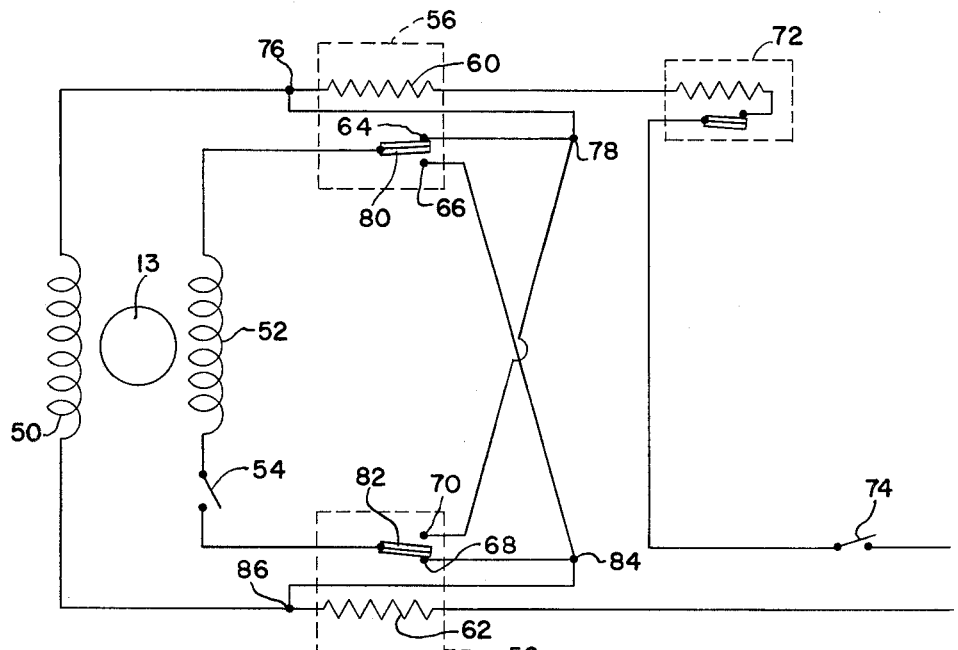
Figure 2:
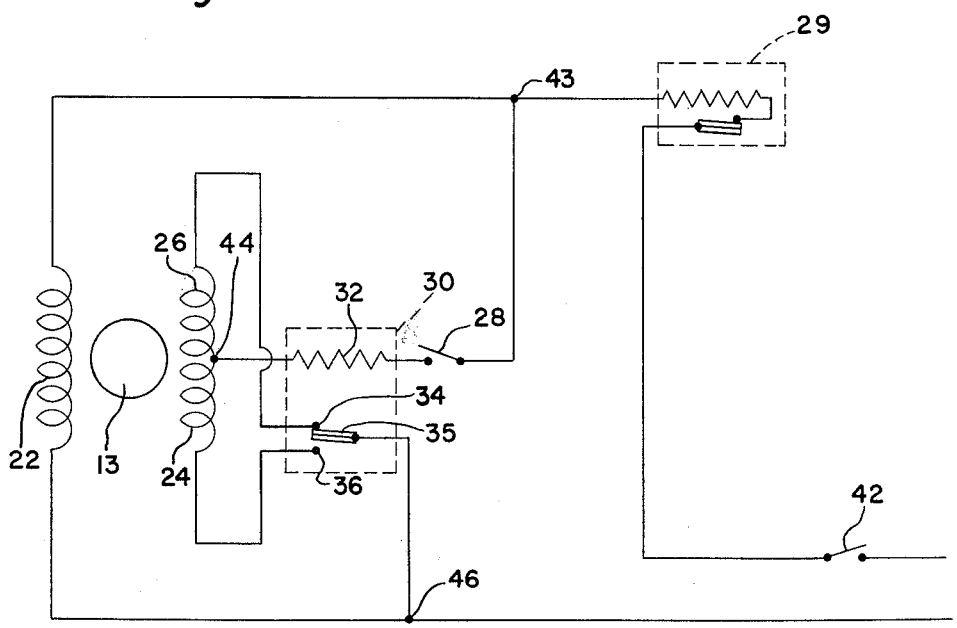

In the drawings:
FIGURE 1 is an elevational view with parts broken away;
FIGURE 2 shows a schematic wiring diagram; and
FIGURE 3 shows an alternate schematic wiring diagram.

Referring now to the drawings wherein preferred embodiments have been shown, reference numeral 10 designates a conventional garbage disposal housing wherein a drive motor 12 having a rotor 13 is supported for imparting rotation to a conventional waste comminuting rotor 14. The rotor 14 is provided with one or more waste propelling vanes 16 which serve to throw the waste against stationary cutting elements 18 provided on the inner surfaces of the stationary housing 10 in accordance with usual practice. During normal operation of the waste disposal unit, the rotor 14 is driven at a high speed so as to cause the waste material introduced into the upper end of the housing 10 to be cut up into small particles which are flushed down into the usual drain outlet 20. It sometimes happens, however, that the motor stalls, such as when some solid object becomes wedged between a part of the rotor 14 and one or more of the cutting projections 18 on the housing 10. The control circuits shown herein provide means for automatically reversing the direction of rotation of the motor under such conditions so as to make it possible to dislodge the wedged material.

In the control circuit shown in FIGURE 2 of the drawings, reference numeral 22 designates the main motor winding and the reference numerals 24 and 26 designate a pair of start windings. The start winding 24 is arranged to cause operation of the motor in the one direction, whereas the start winding 26 is arranged in the circuit in such a manner that when it is energized it will cause the motor to start in the opposite direction. Numeral 28 designates the usual centrifugally operated switch which serves to open the circuit to the start windings in response to a predetermined motor speed in accordance with well-known practice. While the switch 28 has been indicated as a speed responsive switch, it is obvious that this could be any other well-known type of switch, such as a current responsive switch, which would automatically open the circuit to the starting windings when the motor comes up to speed. An overload protector 29 is provided in the circuit and represents a standard type of motor protecting switch which serves to disconnect the motor from the power source when an overload occurs which might jeopardize the condition of the motor.

Numeral 30 designates a thermal relay which for purposes of illustration has been shown as consisting of a heater 32 and a bimetallic thermostat 35 which are connected in the circuit as shown. The free end of the thermostat 35 moves between contact 34 and contact 36. Under normal motor operating conditions the thermostat remains in contact with the contact 34 and only moves into engagement with the contact 36 in the event of motor overloading. The relay 30 operates on a shorter time cycle than the cycle of the thermal protector 29 but the time cycle of the relay 30 is of sufficient length so as not to operate during normal starting conditions. When the main control switch 42 is closed so as to initiate operation of the waste disposal unit, the motor rotor 13 will begin to rotate in the direction which is dictated by the physical design of the starting winding 26. The starting circuit for this motor under normal operating conditions is from junction 43 through the starting switch 28, the heater 32, junction 44, start winding 26, contact 34, bimetallic thermostat 35, junction 46 and back to the power source.

Once the motor has reached its normal switching speed, the starting switch 28 will be opened and the relay 30 will no longer be operative since it has been removed from the power source by the opening of the switch 28. From this point on, unless an overload or stalled condition occurs, the motor will continue to operate under its normal operating characteristics. On the other hand, if an abnormal situation occurs, the motor speed is reduced to a point where the starting switch 28 actuates and closes, this will again produce a current flow through the heater 32 of the thermal relay 30. This time a heavy starting current will be realized and the heater 32, after a predetermined time, will heat the thermostat 35 so as to open the circuit at 34 and close the circuit at 36. This will remove start winding 26 from the circuit and energize start winding 24 which is designed to give the motor opposite rotation to that of the start winding 26. If at this time the motor should not attain the speed required to operate switch 28, a continued heavy current will actuate the thermal overload protector 29 and the motor will be completely deenergized.

Should the motor, when the reversed rotation is obtained, break away from its heavy load conditions, and attain a normal running speed, it will continue to run in this reverse condition until the motor is deenergized. During the normal reversed operation of the motor, it is expected that the heater 32 will return to its normal state whereby the thermostat 35 will move out of engagement with contact 36 and will engage contact 34. Therefore, when the motor is once again started, it will continue to operate in its normal direction of rotation as dictated by the starting winding 26.

In FIGURE 3 of the drawings, there is shown a modified circuit arrangement for accomplishing substantially the same results. In this circuit arrangement, a main motor winding 50 and a single start winding 52 constitute the sole motor windings of a conventional drive motor. A speed responsive start winding control switch 54 is provided which serves to disconnect the starting winding 52 as the motor rotor picks up speed in accordance with standard practice. A conventional thermal overload protector 72 has been provided in the main power circuit in accordance with conventional practice.

In this modified control arrangement a first thermal relay 56 and a second thermal relay 58 have been provided. These relays include heating elements 60 and 62 respectively. The heating element 60 serves to control the thermostat 80 which under normal motor load conditions engages switch contact 64 and only engages switch contact 66 when the motor is overloaded, whereas the heating element 62 controls the thermostat 82 which likewise normally engages switch contact 68.

When the master control switch 74 is closed so as to initiate operation of the garbage disposal unit, power is applied to the motor circuit whereby the motor begins to operate. The flow of current during normal starting of the motor is through the thermal overload protector 72, the heater 60, to junction 76, junction 78, the normally engaged switch contact 64, bimetallic element 80, start winding 52, start switch 54, bimetallic element 82, normally engaged switch contact 68, junction 84, junction 86, heater 62 and back to the main power supply line.

Should the motor speed decrease during operation to a speed where the starting switch 54 closes to energize the start winding 52 for a continued period, an excessive current will be produced through the start winding 52 and main winding 50. This increased current will make either or both relays 56 and 58 to operate. Assuming that relay 56 becomes operative before relay 58, this will cause the circuit to open normally closed switch contact 64 and will cause the circuit to be closed to the normally open contact 66. The start winding will be deenergized due to contact 64 being open. This will further reduce the torque output of this motor and further reduce the speed of the motor or possibly cause the motor to stall completely. This reduced speed or stalled condition will increase the current through the main winding still further, and finally cause the relay 58 to operate causing the thermostat 82 to move from contact 68 into engagement with contact 70. When this operation is complete, the motor will be energized to cause rotation in the opposite direction to the original direction of rotation.

The starting circuit will be energized in the following manner when relays 56 and 58 have been thus operated: from the main power switch 74 through thermal overload protector 72, heater 60, junction 76 to junction 78, contact 70 to bimetallic element 82, start switch 54, start winding 52 to bimetallic element 80, contact 66 to junction 84, heater 62 and back to the main power line.

Should the reverse rotation fail to eliminate the condition of an excessive load, the high current will cause the thermal protector 72 to become operative and deenergize the motor completely. The previous condition is based on the assumption that relay 56 became operative before relay 58, but the circuit would be just as effective if relay 58 operated prior to relay 56.

While the control circuits shown herein are especially useful in waste disposal units, it is obvious that certain aspects of the invention have other applications. For purposes of illustration relays employing heaters adjacent bimetallic elements have been shown whereas relays which depend upon the heat effect of current flowing through the bimetallic elements could be used.

While the embodiments of the present invention as herein disclosed, constitute preferred forms, it is to be understood that other forms might be adopted.

What is claimed is as follows:

In combination, a reversible motor having a main winding and having forward and reverse phase windings, circuit means for connecting said main winding to a source of current, first overload responsive means in said circuit means responsive to the flow of combined main winding current and phase winding current for interrupting the flow of current to said windings in response to a relatively long overload on said motor, second overload responsive means connected in series electrical flow relationship to said first overload responsive means and operable in response to a relatively short overload on said motor for changing the rotation of said motor, said second overload responsive means including a single pole, double throw switch for selectively connecting either of said phase windings to said source of current, and speed responsive switch means connected in series electrical flow relationship to said first overload responsive means for disconnecting said phase windings from said source of current at motor speeds above a predetermined value, said second overload responsive means being responsive to a predetermined flow of current through one of said phase windings only whereby to permit said double throw switch to move from a first position to a second position before changing the rotation of said motor from forward direction to reverse direction in response to a relatively short overload on said motor, said first overload responsive means serving thereafter to open the circuit to said second overload responsive means in the event the overload on said motor becomes relatively long whereby to permit said double throw switch to move from said second position to said first position for conditioning said motor to restart in the forward direction and said first overload responsive means also serving thereafter to reclose the circuit to said second overload responsive means to restart said motor in the forward direction.

References Cited in the file of this patent
UNITED STATES PATENTS

| | | |
|---|---|---|
| 2,141,056 | Watkins | Dec. 20, 1938 |
| 2,539,857 | Noodleman | Jan. 30, 1951 |
| 2,678,775 | Simmons | May 18, 1954 |
| 2,701,855 | Hammes | Feb. 8, 1955 |
| 2,762,004 | Shepardson | Sept. 4, 1956 |
| 2,881,378 | Russell | Apr. 7, 1959 |